US009677472B2

(12) United States Patent
Travis et al.

(10) Patent No.: US 9,677,472 B2
(45) Date of Patent: Jun. 13, 2017

(54) BLEED AIR SLOT

(71) Applicant: United Technologies Corporation, Hartford, CT (US)

(72) Inventors: Brittany Travis, Middletown, CT (US); Crystal Monteiro, Portland, CT (US); Sean Nolan, Wethersfield, CT (US); Rishon Saftler, Glastonbury, CT (US); John P. Virtue, Jr., Middletown, CT (US); Stephen A. Sarcich, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 970 days.

(21) Appl. No.: 13/646,822

(22) Filed: Oct. 8, 2012

(65) Prior Publication Data

US 2014/0096536 A1    Apr. 10, 2014

(51) Int. Cl.
| F02C 6/08 | (2006.01) |
| F02C 9/18 | (2006.01) |
| F04D 29/52 | (2006.01) |
| F04D 29/64 | (2006.01) |
| F04D 27/02 | (2006.01) |

(52) U.S. Cl.
CPC ............... *F02C 6/08* (2013.01); *F02C 9/18* (2013.01); *F04D 29/526* (2013.01); *F04D 29/644* (2013.01); *F04D 27/023* (2013.01); *F04D 27/0207* (2013.01); *F04D 27/0215* (2013.01); *Y10T 29/49236* (2015.01)

(58) Field of Classification Search
CPC .......... F02C 6/08; F02C 9/18; F04D 27/0207; F04D 27/0215
See application file for complete search history.

(56) References Cited

U.S. PATENT DOCUMENTS

| 3,142,438 A * | 7/1964 | Bathgate ............. F04D 27/0215 415/144 |
| 4,344,282 A | 8/1982 | Anders |
| 4,844,689 A | 7/1989 | Seed |
| 5,063,661 A | 11/1991 | Lindsay |
| 5,209,633 A | 5/1993 | McGreehan et al. |
| 6,092,987 A | 7/2000 | Honda et al. |
| 6,109,868 A * | 8/2000 | Bulman ................ F01D 17/105 415/144 |
| 6,325,595 B1 | 12/2001 | Breeze-Stringfellow et al. |

(Continued)

OTHER PUBLICATIONS

International Preliminary Report on Patentability for PCT Application No. PCT/US2013/063294, mailed Apr. 16, 2015.
(Continued)

*Primary Examiner* — Gerald L Sung
*Assistant Examiner* — Scott Walthour
(74) *Attorney, Agent, or Firm* — Carlson, Gaskey & Olds, P.C.

(57) ABSTRACT

A disclosed gas turbine engine includes a case for a case for a compressor section including a bleed air slot. The bleed air slot includes an inlet having a first area radially inward of an outlet having a second area with the second area being greater than the first area. The bleed air slot further includes a center portion disposed along a radial line extending from an axis of the engine and an elongated portion extending from the opening at an angle relative to a line normal to the radial line.

14 Claims, 5 Drawing Sheets

(56) References Cited

U.S. PATENT DOCUMENTS

| | | |
|---|---|---|
| 6,578,351 B1 | 6/2003 | Modafferi |
| 6,622,475 B2 | 9/2003 | Brault et al. |
| 6,986,638 B2 | 1/2006 | Austin et al. |
| 8,015,827 B2 | 9/2011 | Bertolotti et al. |
| 8,100,633 B2 | 1/2012 | Propheter-Hinckley et al. |
| 8,152,460 B2 | 4/2012 | Brunet et al. |
| 2004/0096315 A1 | 5/2004 | Chlus |
| 2006/0039782 A1 | 2/2006 | Martin et al. |
| 2006/0260320 A1* | 11/2006 | Bertolotti ............... F01D 5/145 60/772 |
| 2008/0152500 A1 | 6/2008 | Mehring |
| 2010/0275613 A1 | 11/2010 | Alasti et al. |
| 2012/0070271 A1 | 3/2012 | Urban et al. |

OTHER PUBLICATIONS

International Search Report & Written Opinion for PCT Application No. PCT/US2013/063294 mailed on Jan. 20, 2014.
Supplementary Partial European Search Report for EP Application No. 13845128.1 dated Jun. 27, 2016.
Supplementary European Search Report for EP Application No. 13845128.1 dated Oct. 7, 2016.

* cited by examiner

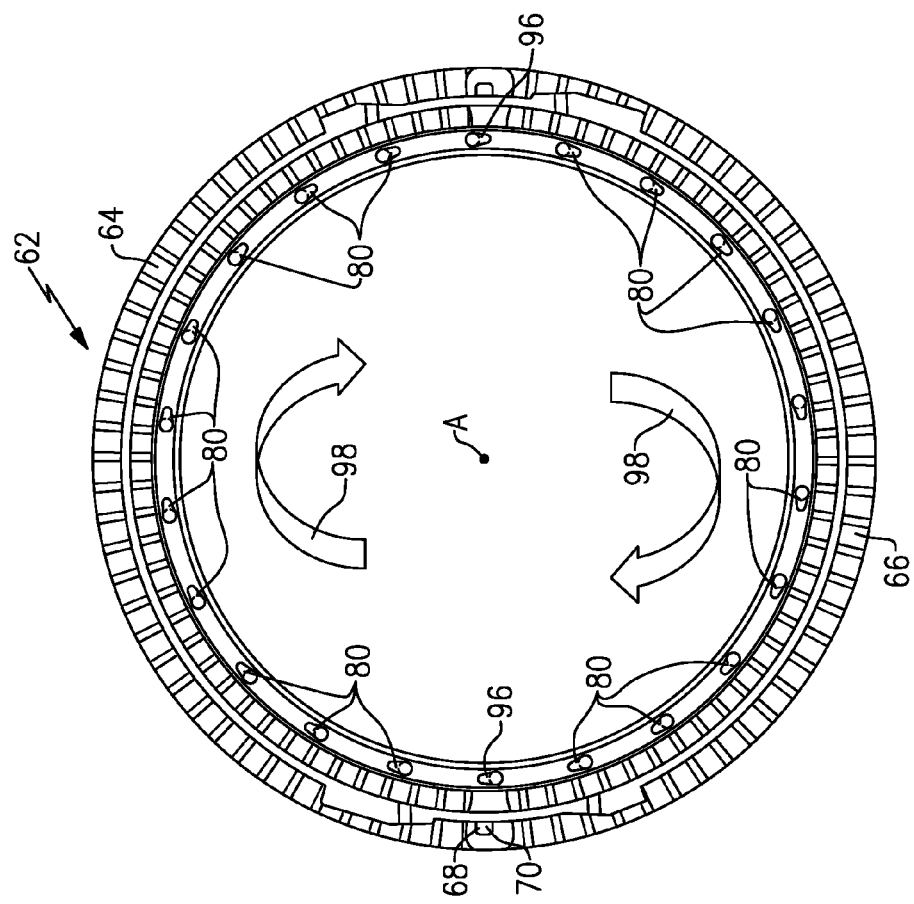
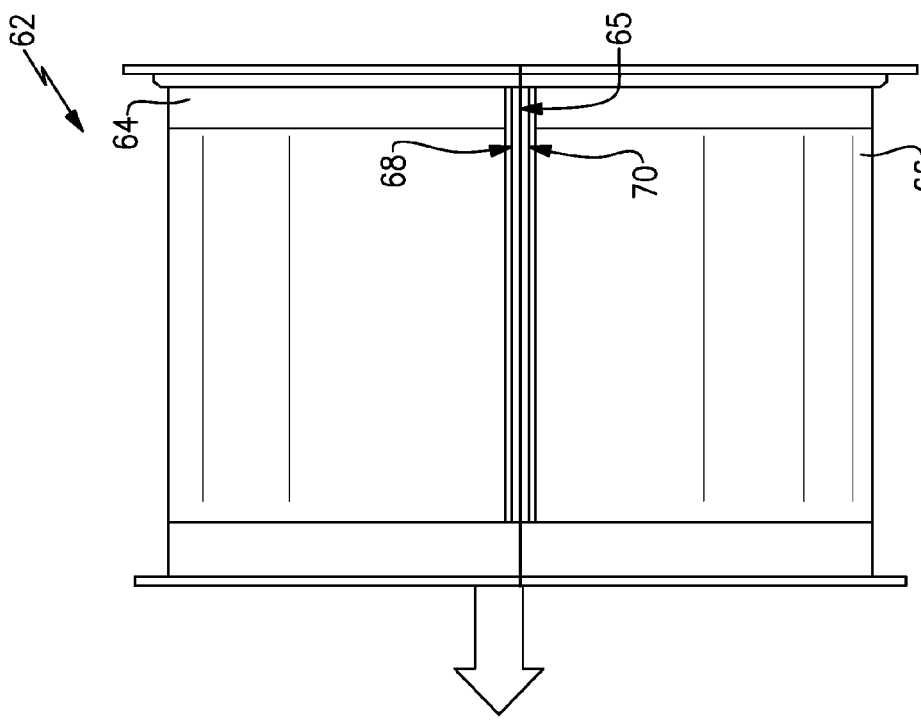

BLEED AIR SLOT

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The turbine section encounters high temperatures and pressures and is therefore provided with cooling airflow. Cooling airflow can be drawn from the relative cool compressor section and routed around the combustor section to the turbine section. The cooling airflow is drawn through openings in the compressor section that are located between stages corresponding to a desired temperature and pressure for cooling the turbine section. Air flow drawn from the compressor decreases the efficiency of the compressor section and decreases overall thermal efficiency of the engine. Moreover, restrictions in cooling airflow passages that communicate airflow to the turbine section can increase the amount of cooling airflow required to be drawn from the compressor and further reduce engine efficiency.

Accordingly, it is desirable to design and develop improved cooling airflow passages for communicating cooling airflow to increase compressor efficiency and overall engine efficiency.

SUMMARY

A gas turbine engine according to an exemplary embodiment of this disclosure, among other possible things includes a fan including a plurality of fan blades rotatable about an axis. A compressor section compresses incoming airflow. The compressor section includes a case surrounding a plurality of compressor stages. A bleed air slot is disposed within the case for drawing air from the compressor section. The bleed air slot includes an inlet having a first area radially inward of an outlet having a second area with the second area greater than the first area. A combustor is in fluid communication with the compressor section and receives airflow from the compressor section. A turbine section is in fluid communication with the combustor. The turbine section is coupled to drive the compressor section and the fan.

In a further embodiment of the foregoing gas turbine engine, the bleed air slot includes a length between the inlet and the outlet greater than a wall thickness of the case.

In a further embodiment of any of the foregoing gas turbine engines, the bleed air slot comprises an opening with a center portion disposed along a radial line extending from the axis and an elongated portion extending from the opening at an angle relative to a line normal to the radial line.

In a further embodiment of any of the foregoing gas turbine engines, the case includes a first case portion attached to a second case portion and an interface bleed air slot comprising structures defined partially by both the first case portion and the second case portion.

In a further embodiment of any of the foregoing gas turbine engines, the bleed air slot includes an inner profile between the inlet and the outlet. The inner profile defines an increasing area between the inlet and the outlet.

In a further embodiment of any of the foregoing gas turbine engines, the bleed air slot is defined within a boss. The boss includes an aft wall varying in thickness from the inlet to the outlet.

In a further embodiment of any of the foregoing gas turbine engines, the boss is disposed radially inward of an outer wall of the case with the aft wall abutted against an inner case of the compressor section.

In a further embodiment of any of the foregoing gas turbine engines, the boss includes a forward lip extending radially outward from the outlet.

In a further embodiment of any of the foregoing gas turbine engines, the inner case is attached to the outer case aft of the boss.

In a further embodiment of any of the foregoing gas turbine engines, the bleed air slot comprises a plurality of bleed air slots spaced circumferentially about the case.

A compressor case for a gas turbine engine according to an exemplary embodiment of this disclosure, among other possible things includes a bleed air slot for communicating airflow from a compressor section. The bleed air slot includes an inlet having a first area and an outlet having a second area greater than the first area and a length between the inlet and the outlet greater than a wall thickness of the case.

In a further embodiment of the foregoing compressor case, the bleed air slot comprises an opening with a center portion disposed along a radial line extending from the axis and an elongated portion extending from the opening at an angle relative to a line normal to the radial line.

In a further embodiment of any of the foregoing compressor cases, the case includes a first case portion attached to a second case portion and an interface bleed air slot comprising structures defined partially by both the first case portion and the second case portion.

In a further embodiment of any of the foregoing compressor cases, the bleed air slot is defined within a boss, the boss including an aft wall varying in thickness from the inlet to the outlet.

In a further embodiment of any of the foregoing compressor cases, the boss includes a forward lip extending radially outward from the outlet.

In a further embodiment of any of the foregoing compressor cases, the bleed air slot comprises a plurality of bleed air slots spaced circumferentially about the case.

A method of assembling a compressor section for a gas turbine engine according to an exemplary embodiment of this disclosure, among other possible things includes attaching a first case portion to a second case portion along corresponding axially extending flanges, inserting an inner case within the attached first case portion and the second case portion such that a forward surface of the inner case abuts a boss defined radially inward of an outer wall of the first and second case portions. The boss includes a bleed air slot for drawing bleed air from the compressor, and attaches the inner case to at least one of the first case portion and the second case portion at a location aft of the boss.

In a further embodiment of the foregoing method, includes the step of defining the boss to include an inlet having a first area and an outlet having a second area greater than the first area and a length between inlet and the outlet that is greater than a wall thickness of one of the first case portion and the second case portion.

In a further embodiment of any of the foregoing methods, the boss includes an aft wall that abuts the inner case. The aft wall includes an inner surface defining a portion of the bleed air slot.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 3 is a side view of an example compressor case.

FIG. 4 is a sectional view of the example compressor case.

DETAILED DESCRIPTION

Figure 1:
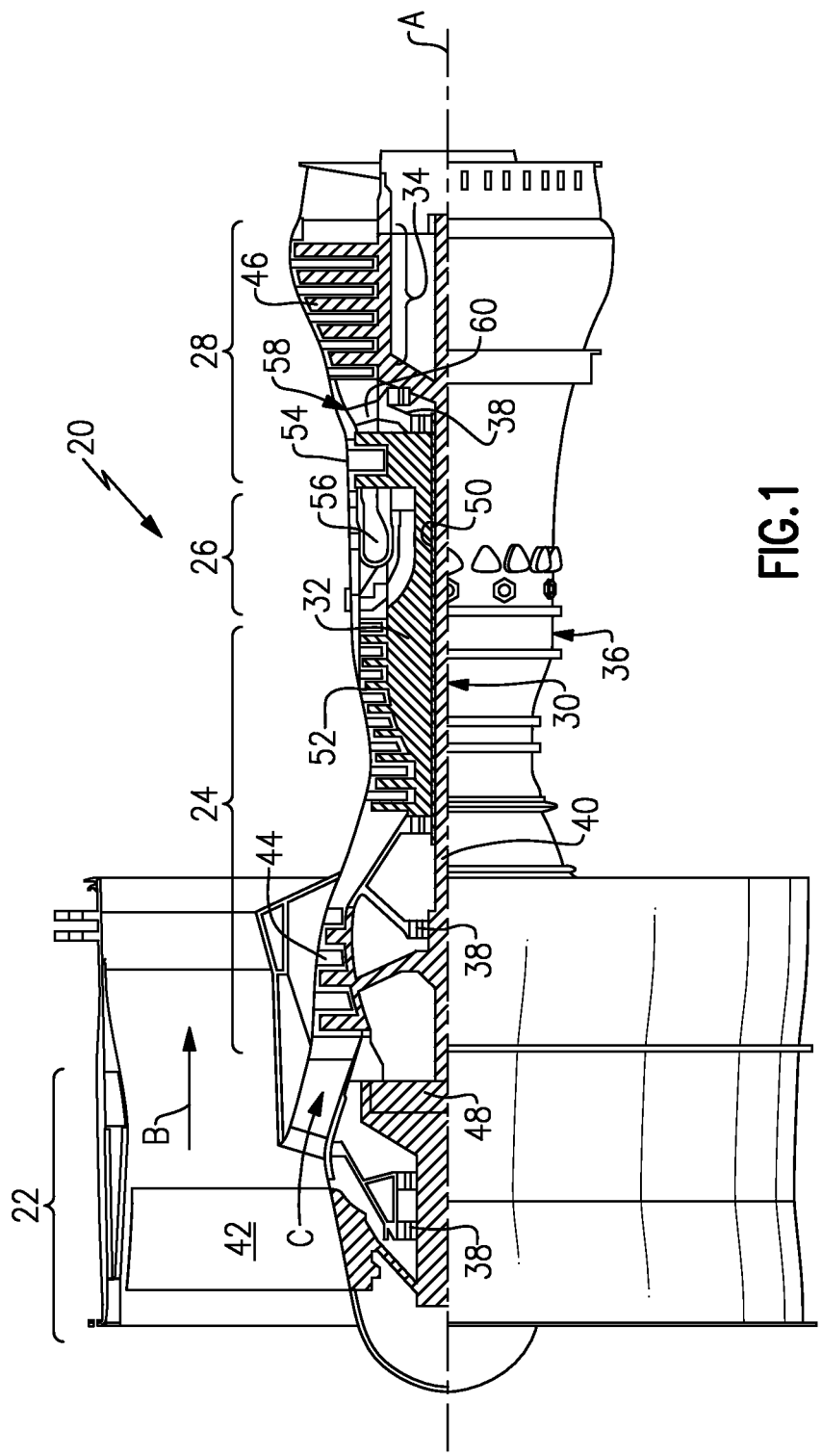
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV")

system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram °R)/518.7)$^{0.5}$]. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
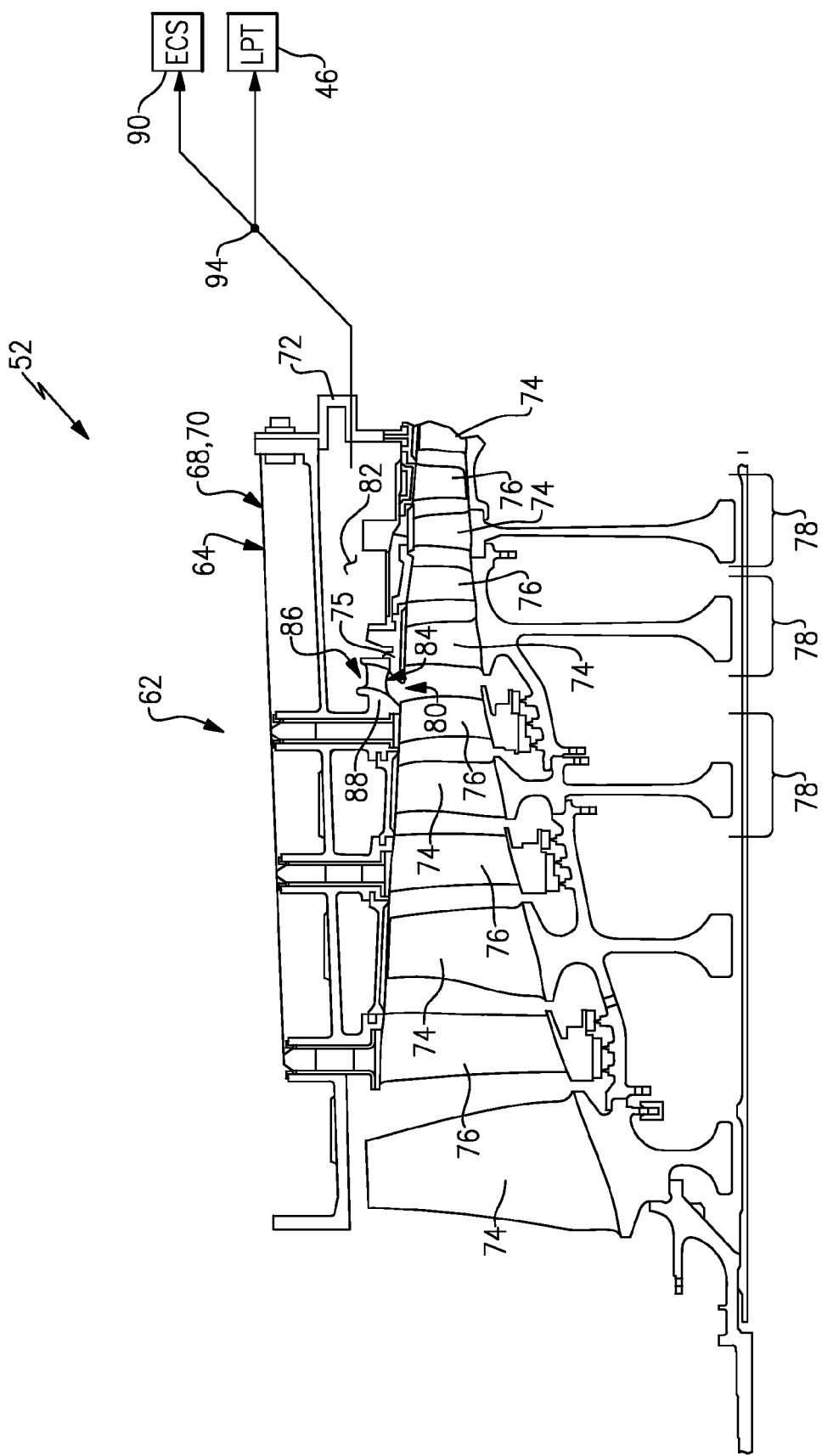
FIG. 2 is a schematic view of an example compressor section of the example gas turbine engine.

Referring to FIGS. 2 and 3, the example compressor section 24 includes the high pressure compressor 52. The high pressure compressor 52 includes a compressor case 62 that includes a first portion 64 and a second portion 66 that are attached at an interface 65 by a first flange 68 and a second flange 70. The high pressure compressor section 52 includes a plurality of rotors 74 interspersed between vanes 76. Each vane 76 and rotor 74 make up a compressor stage 78 of the compressor section 52.

Bleed air from the compressor 52 is communicated through a bleed air slot 80 disposed within one of the compressor stages 78. In this example, the bleed air slot 80 is disposed between the third stage and fourth stage of the compressor 52. The bleed air slot could be located at other points of the compressor 52 that provide the desired pressure and temperature of bleed air.

Bleed air that is communicated from the compressor 52 through the bleed air slot 80 is directed through a cavity 82. The cavity 82 includes further conduits that communicate air through a cooling air system 94 to either other aircraft systems such as an environmental control system schematically illustrated at 90 or other portions of the gas turbine engine 20 such as the low pressure turbine section 46. Moreover, cooling air could be communicated anywhere within the engine 20.

Bleed air is drawn from specific locations within the compressor 52 dependent on a pressure and temperature of air at that section. Accordingly, in the illustrated example the bleed air slot 80 is disposed between the third and fourth stages of the compressor section 52 to communicate air at a pressure in temperature commonly occurring within those stages. However, it is within the contemplation of this disclosure that the bleed air slot 80 could be positioned anywhere within the compressor section 24 that is determined to provide for air flow to other systems within the aircraft at other desired temperatures and pressures.

In this example, an inner case structure 72 is supported within the outer case 62. The inner case structure 72 includes a portion 75 that extends from a forward portion aft to abut a boss 88 including the bleed air slot 80. The boss 88 defines the desired position of the inner case 72 relative to the outer case 62.

The example bleed air slot 80 is disposed within the boss 88 and includes an inlet 84 and an outlet 86. Air is communicated through the inlet 84 through the outlet 86 and into the cavity 82. From the cavity 82, cooling air is dispersed through various conduits by the cooling air system 94 to other systems in the aircraft or engine that require air of the temperature and pressure drawn from the compressor 52. Although the example bleed air slot 80 is disposed within the case 62, the bleed air slot 80 could be provided in other structures within the compressor section 24.

Referring to FIGS. 3 and 4 with continued reference to FIG. 2, the example compressor case 62 includes the first portion 64 and a second portion 66 that are split along the interface 65 and connected by way of the first flange 68 and the second flange 70. A plurality of the bleed air slots 80 are disposed about the case 62 to draw air from the compressor section 52 into the cavity 82 for use throughout the aircraft. Interface bleed air slots 96 are disposed between the first portion 64 and the second portion 66. Each of the interface bleed air slots 96 are defined partially by each of the first case portion 64 and second case portion 66. Air flowing through the compressor section 52 includes a circumferential or rotational component as is indicated by arrows 98. This rotational component creates a swirl within the air that is accommodated by the example bleed air slot 80. Each of the bleed air slots 80 are disposed at an angle based on the rotation of the flow circumferentially to reduce aerodynamic losses caused by the passage of air through the case 62.

Figure 5:
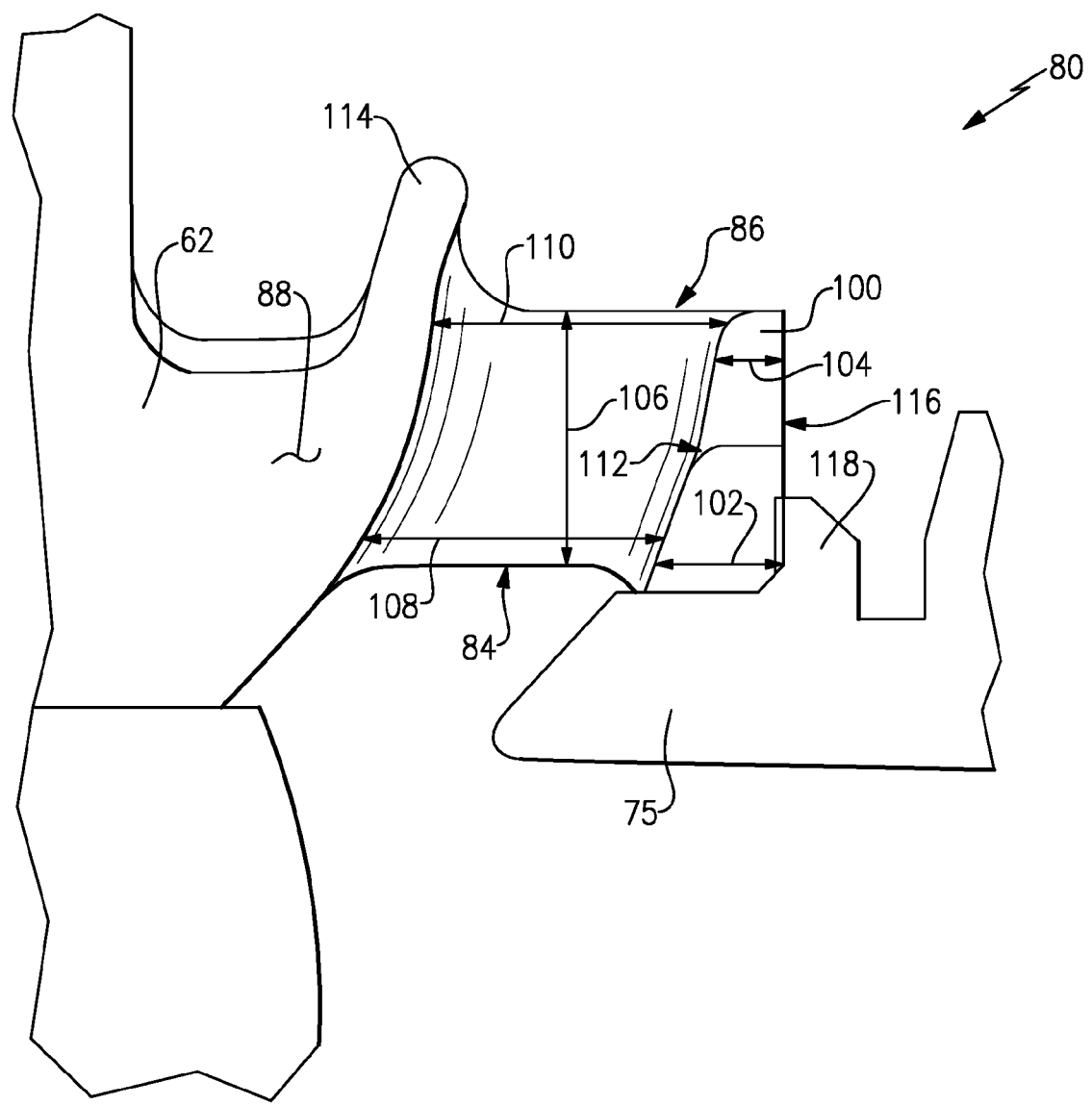
FIG. 5 is a cross-section of an example bleed air slot.

Referring to FIG. 5 with continued reference to FIG. 2, the example bleed air slot 80 includes the inlet 84 and the outlet 86. The inlet 84 includes an area 108 and the outlet 86 includes an area 110. The first area 108 is less than the second area 110. The difference in areas 108,110 provides an increasing area in a direction radially outward towards the outlet 86 to provide a desired diffusion of air.

The increasing area in a direction from the inlet 84 towards the outlet 86 is provided in part by an aft wall 100. In this example, the aft wall 100 includes a thickness that varies to provide a tapered inner surface 112. In this example, the tapered inner surface 112 is defined in part by a thickness of the wall 100. The wall 100 includes a first thickness 102 that is disposed adjacent to the inlet 84 and a second thickness 104 to dispose significantly adjacent to the outlet 86. The thickness 104 is less than the thickness 102. The decreasing of thicknesses of the wall 100 in a direction towards the outlet 86 provides for the definition of the increasing area of the opening through the bleed air slot 80.

The bleed air slot 80 also performs a mounting function for fitting of the inner case 72 relative to the outer case 62. In this example, the inner case 72 includes a shoulder 118 that abuts an aft surface 116 of the aft wall 100. The entire bleed air slot 80 is defined within the boss 88 that extends aft from a portion of the case 62.

In the disclosed example, the boss 88 is the aft most part of the case 62 and is disposed radially inward of an outer surface of the case 62. The example bleed air slot 80 includes a forward lip 114 that's disposed adjacent to the outlet 86 that further defines the aerodynamic transition from the compressor section and the various stages through the bleed air slot 80 into the cavity 82. The forward lip 114 aids diffusion in airflow through the bleed air slot 80. The smooth transition between the inlet 84 and the outlet 86 reduces aerodynamic losses to provide more efficient flow of cooling air from the compressor section 52. As appreciated, efficiently drawing air from the compressor section 52 reduces the amount of cooling air required to perform the desired functions throughout the aircraft and remaining parts of the engine. Reducing the demand of bleed air increases the efficiency of the compressor and thereby the overall efficiency of the gas turbine engine 20.

Figure 7:
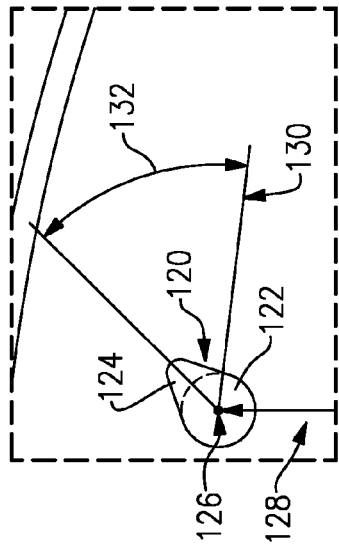
FIG. 7 is a schematic view of an example bleed air slot opening.
Figure 8:
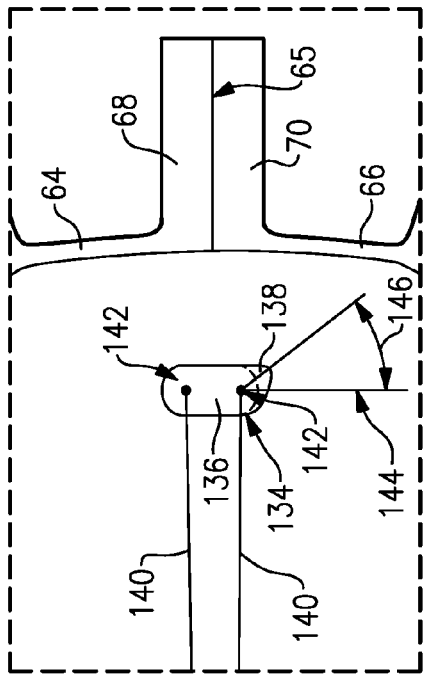
FIG. 8 is another schematic view of another example bleed air slot opening.
Figure 6:
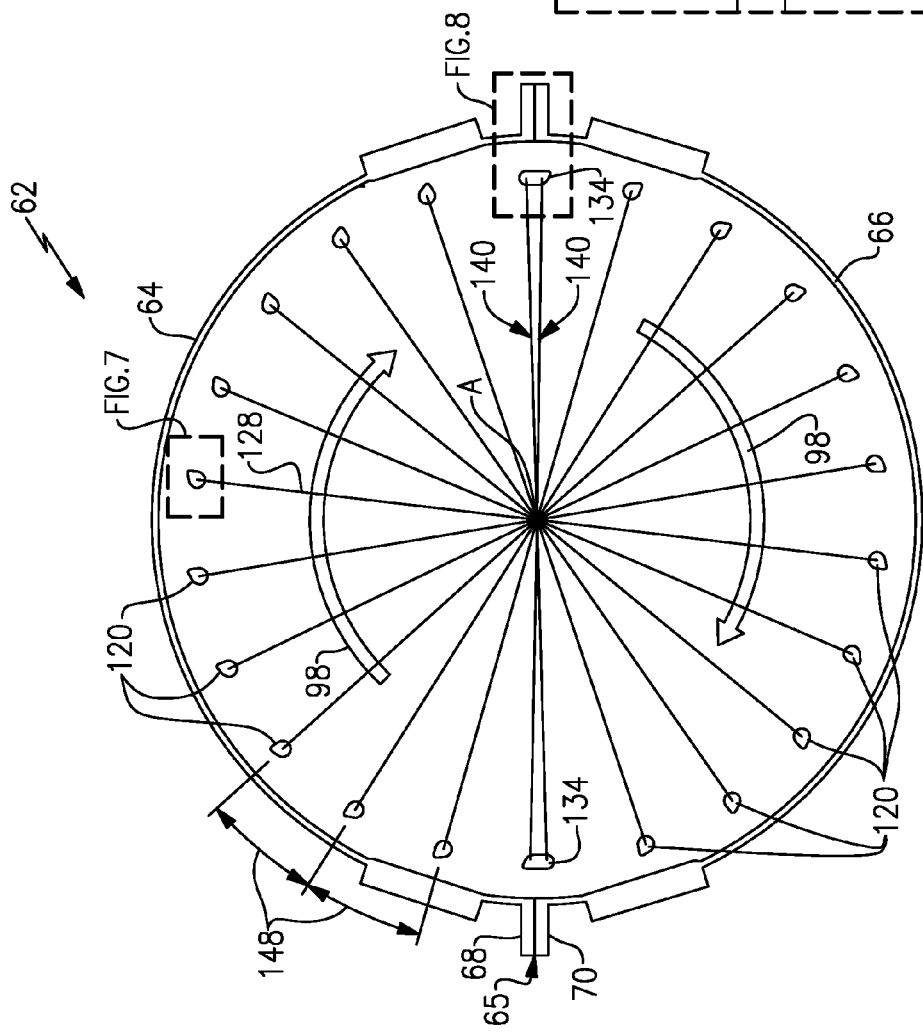
FIG. 6 is a schematic view of an example compressor case.

Referring to FIGS. 6, 7, and 8 with continued reference to FIGS. 2 and 5, the example compressor case 62 includes the first half 68 and second half 70. They are attached at the interface 65 by way of the flanges 68, 70. The bleed air slots 80 define openings 120 through the compressor case 62. The bleed air slots 80 are spaced circumferentially apart a distance 148 about the case 62 and the axis A. In this example, the openings 120 are spaced circumferentially apart a distance 148 equally about the circumference of the combustor case 62.

An interface bleed air slot opening 134 is disposed at each of the flange interfaces disposed on opposite sides of the fan case 62.

Each of the openings 120 includes a central portion 122 that is substantially a circular opening extending through the bleed air slot 80. Each of the openings 120 also includes an elongated portion 124 that extends from the central circular portion 122. The elongated portions 124 are each angled relative to a line normal to a radial line extending from the axis A.

Each of the openings 120 are a radial distance apart from the axis A to a radial point 126. A radial line 128 extending from the axis A to the radial point 126 is utilized to define a line normal 130 to the radial line 128. The elongated portion 124 of the opening 120 is disposed at an angle relative to that normal line 130. The normal line 130 is disposed at a 90° angle relative to the radial line 128 that extends from the axis A to the radial point 126. Each of the plurality of bleed air slot openings 120 includes a similar angle 132 to provide the desired flow characteristics of the bleed air slot 80.

In this example, each of the interface bleed air slot openings 134 are comprised of a central portion 136 and an elongated portion 138. In this example, the central portion 136 comprises an oval having radial points 142 that are disposed at the end of radial lines 140. As appreciated, as the central portion 136 of the opening 134 is a substantial oval there are two center points as is shown at 142. Both of the center points are disposed at a common radial distance or along a common radial line 140 from the axis A. The elongated portion 138 extends from one of the radial points 142 at an angle 146 relative to a normal line 144 drawn perpendicular to the radial lines 140. The elongated portion 138 is disposed on an end that is common to a direction of the circumferential flow 98 as illustrated by the arrows 98 in FIG. 6.

The specific angular orientation of each of the elongated portions 124 correspond with the circumferential flow components indicated by arrows 98 that are present within the compressor section 52 during operation. The angular relationship between each of the openings 120 corresponding with the circumferential flow indicated by arrows 98 provides a more efficient aerodynamic flow of air through each of the plurality of bleed air slots 80. In a non-limiting dimensional embodiment, the angle 132 is between about 45 and 55 degrees. In a further non-limiting embodiment the angle 132 is between 50 and 55 degrees. In another non-limiting dimensional embodiment the angle 146 is between about 35 and 45 degrees. Moreover, in a further non-limiting dimensional embodiment the angle 146 is between about 35 and 40 degrees.

The disclosed example bleed air slot 80 provides improved aerodynamic flow of the bleed air from the compressor into the cooling air systems by reducing aerodynamic losses and other restrictions that potentially reduce efficiency of the compressor section 52.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A compressor case for a gas turbine engine comprising:
a boss including a forward lip and an aft wall;
at least two bleed air slots defined within the boss between the forward lip and the aft wall, the at least two bleed air slots spaced circumferentially apart, each of the at least two bleed air slots for communicating airflow from a compressor section, wherein each of the at least two bleed air slots includes an inlet defining a substantially teardrop shape and having a first cross-sectional area, an outlet having a second cross-sectional area greater than the first cross-sectional area, and a length between the inlet and the outlet, the length between the inlet and the outlet being greater than a wall thickness of the compressor case;
wherein the substantially teardrop shape of each inlet includes a substantially circular center portion disposed about a radial line extending from a longitudinal axis of the gas turbine engine and an elongated portion coplanar with the substantially circular center portion and extending from the substantially circular center portion at an angle relative to a line normal to the radial line.

2. The compressor case as recited in claim 1, wherein the compressor case includes a first case portion attached to a second case portion and an interface bleed air slot at least partially defined by both the first case portion and the second case portion.

3. The compressor case as recited in claim 1, wherein the aft wall varies in axial thickness between the inlet and the outlet.

4. The compressor case as recited in claim 3, wherein the forward lip extends radially outward from the outlet.

5. The compressor case as recited in claim 1, wherein the at least two bleed air slots comprise more than two bleed air slots spaced circumferentially apart about the compressor case.

6. A gas turbine engine comprising:
a fan including a plurality of fan blades rotatable about an axis;
a compressor section for compressing incoming airflow, the compressor section including a case surrounding a plurality of compressor stages;
at least two bleed air slots defined within the case and spaced circumferentially apart, the at least two bleed air slots for drawing air from the compressor section, wherein each of the at least two bleed air slots includes an inlet defining a substantially teardrop shape and having a first cross-sectional area, an outlet disposed radially outward from the inlet, the outlet having a second cross-sectional area greater than the first cross-sectional area;
wherein the substantially teardrop shape of each inlet comprises a substantially circular center portion disposed about a radial line extending from the axis and an elongated portion coplanar with the substantially circular center portion and extending from the substantially circular center portion at an angle relative to a line normal to the radial line;

a combustor in fluid communication with the compressor section and receiving airflow from the compressor section; and a turbine section in fluid communication with the combustor, the turbine section coupled to drive the compressor section and the fan.

7. The gas turbine engine as recited in claim 6, wherein each of the at least two bleed air slots include a length between the inlet and the outlet greater than a wall thickness of the case.

8. The gas turbine engine as recited in claim 6, wherein the case includes a first case portion attached to a second case portion and an interface bleed air slot at least partially defined by both the first case portion and the second case portion.

9. The gas turbine engine as recited in claim 6, wherein each of the at least two bleed air slots include an inner profile between the inlet and the outlet, the inner profile defining an increasing area between the inlet and the outlet.

10. The gas turbine engine as recited in claim 9, wherein each of the at least two bleed air slots are defined within a boss, the boss including an aft wall varying in thickness from the inlet to the outlet.

11. The gas turbine engine as recited in claim 10, wherein the boss is disposed radially inward of an outer wall of the case with the aft wall abutted against an inner case of the compressor section.

12. The gas turbine engine as recited in claim 10, wherein the boss includes a forward lip extending radially outward from the outlet.

13. The gas turbine engine as recited in claim 11, wherein the inner case is attached to the case aft of the boss.

14. The gas turbine engine as recited in claim 6, wherein the at least two bleed air slots comprise more than two bleed air slots spaced circumferentially apart about the case.

* * * * *